No. 840,360. PATENTED JAN. 1, 1907.
J. M. NORMAND.
TRESTLE.
APPLICATION FILED APR. 3, 1905.
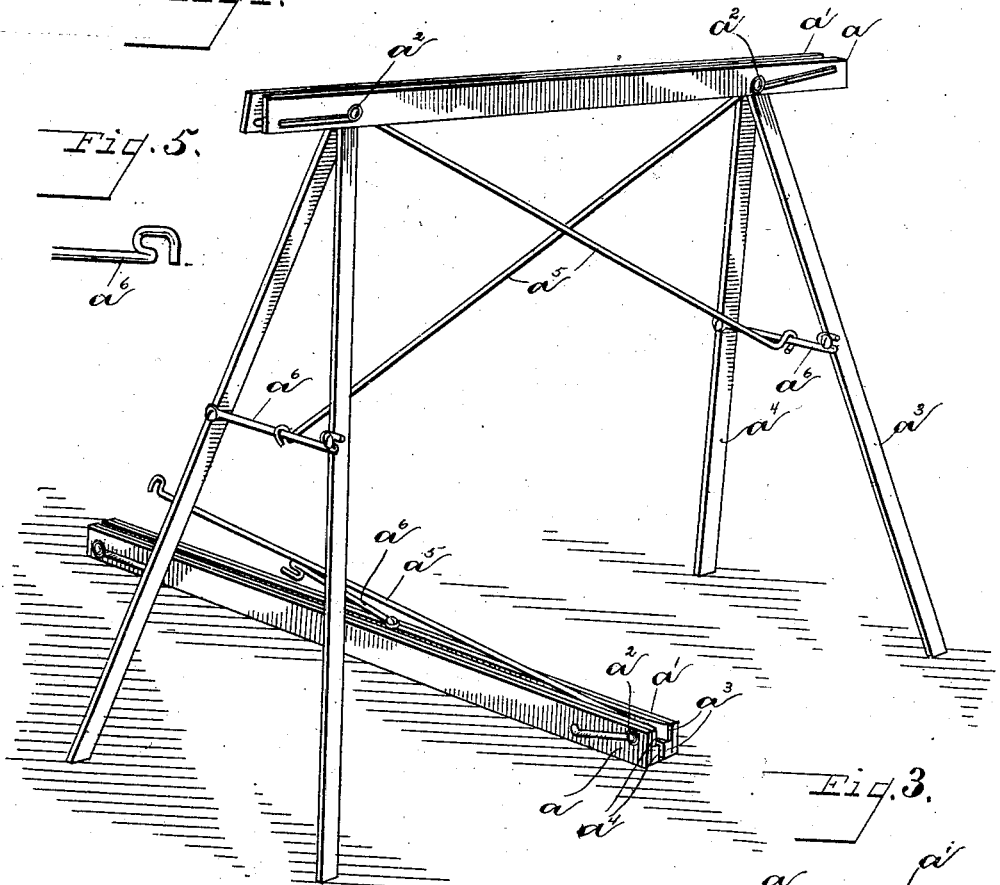

UNITED STATES PATENT OFFICE.

JOSEPH M. NORMAND, OF SPRINGFIELD, OHIO, ASSIGNOR TO THE RIDGELY TRIMMER COMPANY, OF SPRINGFIELD, OHIO, A CORPORATION OF WEST VIRGINIA.

TRESTLE.

No. 840,360.　　　Specification of Letters Patent.　　　Patented Jan. 1, 1907.

Application filed April 3, 1905. Serial No. 253,701.

*To all whom it may concern:*

Be it known that I, JOSEPH M. NORMAND, a citizen of the United States, residing at Springfield, in the county of Clark and State of Ohio, have invented certain new and useful Improvements in Trestles, of which the following is a specification.

My invention relates to improvements in trestles.

My object is to construct a trestle that will be easily folded into compact form without protruding ends and yet be securely connected when in assembled position.

My object is to overcome the defects in prior devices where the parts after being assembled are easily disorganized by movement of the trestle, while retaining the desirable feature of a trestle which may be readily folded into compact form.

Figure 1 is a perspective view of two trestles, one being shown in assembled position, while the other is in folded position. Fig. 2 is a detail view of the parts of my trestle as they reach folding position. Fig. 3 is a sectional view showing the beams and spreading legs. Fig. 4 is a detail view of the modification of beams that may be used. Fig. 5 is a detail view of the modification of one of the braces.

Like parts are indicated by like letters of reference throughout the several views.

I have preferably shown two beams $a\ a'$. These beams are supported by bolts $a^2$, which constitute supports for said beams, also connecting the same to the folding legs $a^3\ a^4$. The jaws or top portion on the folding legs $a^3\ a^4$ extend within the space formed between the two beams. The bolts $a^2$ extend through the upper portion or jaws of said folding legs, extending also through the beams, and are formed with heads which bind the beams and jaws together. It is apparent that when the lower ends of the legs are extended and held extended the jaws will, by reason of the formation of the openings, as shown in Fig. 2, operate with the bolts to clamp and hold the beams, the bolts $a^2$ constituting the part connecting the jaws and the beams as well as supporting the beams.

It will be seen from Fig. 1 that there is a slot formed in each end of each beam, and by reason of the formation of these slots the bolt $a^2$, while always remaining in contact with the beams, may still be adjusted laterally for the purpose of folding the legs and beams into compact form. The brace-rods $a^5$ are shown pivoted on the bolt $a^2$ and extending from said bolt to the cross-braces $a^6$. I have shown two brace-rods and two cross-braces. From this construction it is apparent that when the parts are in assembled position and the cross-brace $a^6$ holds the lower ends of the spreading legs apart, with the braces $a^5$ projecting from the bolt to one of the cross-braces, the trestle is so assembled that it cannot be disorganized by merely jarring or raising the trestle bodily. The bolts $a^2$ are held securely against the inner ends of the slots by means of the braces, and the bolts cannot be dropped away from the beam, and thereby destroy the supports of said beam.

When it is desired to fold the beams and spreading legs into compact form, the braces $a^5$ are disconnected from the cross-braces $a^6$, and the cross-braces are released from their operative position, (shown in Fig. 1,) so that the legs may be folded together. Thereupon the bolts may be moved laterally within the slots, so that the jaws of the spreading legs assume positions near the extreme ends of the beam. The spreading legs at the left are then folded into position immediately below the beams, as shown in Fig. 2, while the spreading legs $a^3\ a^4$ at the right are raised over and above the beams and assume the position shown in Fig. 2. It is apparent from Fig. 1 that the slot at the right in Fig. 1, formed in the beams, is an incline, the purpose being to raise the bolt $a^2$, so that when the spreading legs at the right of Fig. 1 are folded into compact form, as shown in Fig. 2, the jaws will be near the upper side of said beams, while the ends of the other pair of beams will be folded into position spreading legs will be folded into position within the lower part of the space formed between the two beams.

In the modification shown in Fig. 4 both slots are inclined, and the bolts in assembled position are located near the center of the beams, one of said bolts being moved to a point near the lower edge of the beam, while the other bolt is raised at a point near the upper edge of the beam. In both constructions it is desirable to form at the inner ends of the slot an extended opening which will tend to hold the bolt more securely against lateral movement.

The modification in Fig. 5 shows the lower ends of the brace-rod $a^5$ formed with a hook-shaped projection, which makes a more secure fastening to the cross-brace.

Having thus described my invention, I claim—

1. A trestle comprising a beam, having slots in its ends, supports for said beam extending within the slots, a plurality of spreading legs, and mechanism for holding the legs in operative position, both pivotally connected to the supports.

2. In a trestle, the combination of a beam, a plurality of pairs of spreading legs, guides at each end of said beam, one of said guides being inclined, and supports held within said guides.

3. In a trestle, the combination of a pair of beams, a plurality of pairs of spreading legs, adapted at their upper ends to extend between said beams, a central body portion for said beams, and guides at the end thereof, braces extending from said end portions to the legs, and braces connecting said legs, for the purpose specified.

4. A trestle, comprising a beam having slots in its ends, supports for said beam extending within the slots, a plurality of pairs of spreading legs, and mechanism for holding the legs in operative position, both pivotally connected to the supports, the slots at one end being inclined, for the purpose specified.

In testimony whereof I have hereunto set my hand this 22d day of March, A. D. 1905.

JOSEPH M. NORMAND.

Witnesses:
S. C. NORMAND,
CHAS. I. WELCH.